United States Patent
Lee et al.

(10) Patent No.: US 10,356,698 B2
(45) Date of Patent: Jul. 16, 2019

(54) METHOD AND APPARATUS FOR FAST SCANNING FOR WIRELESS LAN AP SEARCH HAVING LOW NETWORK LOAD

(71) Applicant: SAMSUNG ELECTRONICS CO., LTD., Suwon-si (KR)

(72) Inventors: Jinsung Lee, Suwon-si (KR); Hakyung Jung, Seoul (KR); Jungshin Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 31 days.

(21) Appl. No.: 14/904,769

(22) PCT Filed: Jul. 14, 2014

(86) PCT No.: PCT/KR2014/006331
§ 371 (c)(1),
(2) Date: Jan. 13, 2016

(87) PCT Pub. No.: WO2015/009000
PCT Pub. Date: Jan. 22, 2015

(65) Prior Publication Data
US 2016/0183172 A1    Jun. 23, 2016

(30) Foreign Application Priority Data
Jul. 15, 2013    (KR) .................... 10-2013-0083039

(51) Int. Cl.
*H04W 48/16*    (2009.01)
*H04W 72/04*    (2009.01)
(Continued)

(52) U.S. Cl.
CPC ........... *H04W 48/16* (2013.01); *H04W 48/06* (2013.01); *H04W 72/0433* (2013.01); *H04W 28/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,580,700 B1 * | 6/2003 | Pinard | G06K 17/0022 370/332 |
| 7,333,460 B2 | 2/2008 | Vaisanen et al. | |

(Continued)

FOREIGN PATENT DOCUMENTS

| | | |
|---|---|---|
| JP | 2013-522986 | 6/2013 |
| KR | 10-2013-0026657 | 3/2013 |

(Continued)

OTHER PUBLICATIONS

International Search Report corresponding to International Patent Application No. PCT/KR2014/006331, dated Oct. 23, 2014.

(Continued)

*Primary Examiner* — James P Duffy
(74) *Attorney, Agent, or Firm* — The Farrell Law Firm, P.C.

(57) ABSTRACT

The present invention relates to a method and an apparatus enabling a terminal to obtain information required for a wireless LAN AP search from a cellular base station in order to use a wireless LAN service, and to access a wireless LAN AP having a low network load in a short time. The communication method of a terminal according to one embodiment of the present invention may comprise the steps of: switching a channel to an AP scanning channel, which is a channel for searching for a wireless LAN AP between the terminal and the wireless LAN AP; transmitting a wireless LAN AP search signal from the AP scanning channel; receiving, from the wireless LAN AP, a wireless LAN AP response signal, transmitted after an offset time set in accordance with the load state of the wireless LAN AP; and switching the channel to a data transmitting and receiving (Continued)

channel for data communications with the wireless LAN AP. According to one embodiment of the present invention, the terminal can always select the AP having the lowest load by performing a search on all surrounding wireless LAN APs.

8 Claims, 14 Drawing Sheets

(51) Int. Cl.
*H04W 48/06* (2009.01)
*H04W 84/12* (2009.01)
*H04W 28/08* (2009.01)

(56) References Cited

U.S. PATENT DOCUMENTS

| | | |
|---|---|---|
| 7,457,620 B2 | 11/2008 | Lam et al. |
| 2003/0087645 A1* | 5/2003 | Kim .............. H04W 28/16 455/453 |
| 2004/0137907 A1* | 7/2004 | Kim .............. H04W 72/0446 455/450 |
| 2005/0094558 A1* | 5/2005 | Lu ................ H04W 28/08 370/229 |
| 2006/0040663 A1* | 2/2006 | Ise ................ H04W 88/08 455/434 |
| 2007/0197246 A1 | 8/2007 | Julian |
| 2011/0205969 A1* | 8/2011 | Ahmad ............ H04W 16/28 370/328 |
| 2011/0222523 A1 | 9/2011 | Fu et al. |
| 2011/0307609 A1 | 12/2011 | Rangarajan et al. |
| 2012/0051351 A1 | 3/2012 | Lee et al. |
| 2012/0287783 A1 | 11/2012 | Kuhn et al. |
| 2013/0028116 A1 | 1/2013 | Kostic et al. |
| 2013/0058310 A1 | 3/2013 | Park et al. |
| 2013/0095845 A1* | 4/2013 | Lim ................ H04W 36/0066 455/452.2 |
| 2013/0109314 A1* | 5/2013 | Kneckt ............ H04W 4/008 455/41.2 |
| 2013/0188628 A1 | 7/2013 | Lee et al. |
| 2014/0328168 A1* | 11/2014 | Park ................ H04W 74/0808 370/230 |
| 2016/0007247 A1* | 1/2016 | Lee ................ H04W 36/0066 370/331 |

FOREIGN PATENT DOCUMENTS

| | | |
|---|---|---|
| KR | 10-2013-0028972 | 3/2013 |
| KR | 10-2013-0079209 | 7/2013 |
| WO | 2011/086097 A1 | 7/2011 |

OTHER PUBLICATIONS

Communication with Supplementary Partial European Search Report corresponding to European Patent Application No. EP 14826995.4, dated Jan. 30, 2017.
Alcatel-Lucent et al: "Level of Inter-working for 3GPP-WiFi network selection", 3GPP DRAFT; R2-131318, Level of Interworking 0.1, 3rd Generation Partnership Project (3GPP), Mobile Competence Centre; 650, Route Des Lucioles; F-06921 Sophia-Antipolis Cedex; France, vol. RAN WG2, No. Chicago, USA; Apr. 15. 2013-Apr. 19, 2013, Apr. 5. 2013 (Apr. 5, 2013), XP050699325, Retrieved from the Internet: URL: http://www.3gpp.org/ftp/tsg ran/ WG2 RL2/TSGR2 81bis/Docs/ [retrieved on Apr. 5, 2013].

* cited by examiner

FIG. 8

| Element ID | Length | Channel Switch Mode | New Channel Number | Channel Switch Count |
|---|---|---|---|---|
| 1 | 1 | 1 | 1 | 1 |

Octets:

METHOD AND APPARATUS FOR FAST SCANNING FOR WIRELESS LAN AP SEARCH HAVING LOW NETWORK LOAD

CROSS-REFERENCE TO RELATED APPLICATIONS/INCORPORATION BY REFERENCE

This application is a National Phase Entry of PCT International Application No. PCT/KR2014/006331, filed on Jul. 14, 2014, and claims priority to Korean Patent Application No. 10-2013-0083039, filed on Jul. 15, 2013, the contents of which are incorporated herein by reference in their entirety.

TECHNICAL FIELD

The present invention relates to a dual mode UE which can use both a cellular network and a Wireless LAN (WLAN) network. More particularly, the present invention relates a method and an apparatus in which a UE acquires information required for a WLAN Access Point (AP) search from a cellular Base Station (BS) to use a wireless service and accesses a WLAN AP having a light network load within a short time.

BACKGROUND ART

A process of discovering a Wireless Local Area Network (WLAN) Access Point (AP) should be pre-performed to allow a terminal to use a WLAN service. Such a process of discovering the WLAN AP may be largely divided into two methods such as passive scanning and active scanning.

The passive scanning corresponds to a method in which a User Equipment (UE) receives a beacon frame which a WLAN AP periodically (for example, generally 100 ms) transmits and identifies the existence of the WLAN AP. At this time, for example, a maximum duration of 100 ms is required per channel according to a time point when the terminal acquires the beacon frame.

Next, the active scanning corresponds to a method in which, when the UE directly transmits a probe request frame to an AP and the AP receives the probe request frame, the AP transmits a probe response frame to the UE to inform the UE of the existence of the AP itself. The method takes little time to discover the AP per channel compared to the passive scanning, but the UE should generate the probe request frame and transmit the probe request frame to the AP, which acts as a burden to the terminal. Further, there is another burden in that the AP should generate a packet in addition to the beacon frame.

FIG. 1 illustrates a relation between throughput and overload of the UE according to the number of terminals which access one WLAN AP.

Since the UE cannot know how much of a network load the AP has before accessing (attaching) the WLAN AP, it is difficult to guarantee good performance. For example, as illustrated in FIG. 1A, as the number of UEs, which access one WLAN Access Point (AP) increases, it is noted that throughput of each UE rapidly decreases. Further, as illustrated in FIG. B, as the number of UEs, which access one WLAN AP increases, it is noted that a ratio of overload of the AP increases. As described above, if a new UE accesses an overloaded AP, which many UEs have already accessed and thus has a large loads, both the existing UEs and the new UE may have a serious performance deterioration problem.

Accordingly, one AP should not accept access of a predetermined number or more of UEs, or access of UEs should be distributed to APs that use different channels. In order to solve the above problem, an IEEE 802.11 standard document published in 2012 has added a function by which the UE can identify loads of the AP before accessing the WLAN AP through an element of "Basic Service Set (BSS) load" added to a beacon or probe response frame. However, such a method still has a burden in that the UE should receive and decode the beacon or probe response frame, so that the basic limitation, which cannot reduce the time to discover the WLAN AP, still exists.

As described above, the WLAN AP installed by a network service provider may not be sufficiently used, the UE may access the overloaded AP, and power consumption of the UE may increase due to unnecessary WLAN AP scanning.

DISCLOSURE OF INVENTION

Technical Problem

The present invention is proposed to meet the aforementioned requirements and an object of the present invention is to allow a UE to discover all neighboring WLAN APs to always select an AP having a lightest load.

Further, another object is to allow the UE to significantly reduce a WLAN AP scanning time compared to the conventional scheme and thus to decrease power consumption and improve WLAN service use quality.

Moreover, another object is to allow a mobile communication service provider to easily provide a load-balanced WLAN service through a cellular BS.

Furthermore, another object is to efficiently offload cellular traffic through a WLAN.

The technical subjects pursued in the present invention may not be limited to the above mentioned technical subjects, and other technical subjects which are not mentioned may be clearly understood, through the following descriptions, by those skilled in the art of the present invention.

Solution to Problem

In order to achieve the objects, a communication method of a User Equipment (UE) according to an embodiment of the present invention may include: switching a channel to an AP scanning channel which is a channel for discovering a Wireless Local Area Network (WLAN) Access Point (AP) between the UE and the WLAN AP; transmitting a WLAN AP discovery signal in the AP scanning channel; receiving, from the WLAN AP, a WLAN AP response signal transmitted after an offset time set according to a load state of the WLAN AP passes; and switching the channel to a data transmission/reception channel for data communication with the WLAN AP.

The switching of the channel to the scanning channel may include: receiving information on the AP scanning channel from an AP management entity; and switching the channel to the AP scanning channel by using the information on the AP scanning channel.

The switching of the channel to the scanning channel may further include: receiving at least one of Service Set Identifiers (SSIDs) of WLAN APs and information on the data transmission/reception channel; and transmitting at least one of the SSIDs of the WLAN APs and the information on the data transmission/reception channel to the AP management entity.

The transmitting of the WLAN AP discovery signal may include: determining whether the WLAN AP discovery signal is transmitted within a preset time; and when the WLAN AP discovery signal is not transmitted within the preset time, transmitting channel busy information to the AP management entity.

The WLAN AP response signal may further include information on the data transmission/reception channel of the WLAN AP, and the switching of the channel to the data transmission/reception channel may include switching the channel to the data transmission/reception channel by using the information on the data transmission/reception channel of the WLAN AP included in the WLAN AP response signal.

In order to achieve the objects, a communication method of Wireless Local Area Network (WLAN) Access Point (AP) according to an embodiment of the present invention may include: setting an AP scanning channel which is a channel for discovering a WLAN AP between a User Equipment (UE) and the WLAN AP; setting an offset time according to a load state of the WLAN AP; receiving a WLAN AP response signal from the UE through the AP scanning channel; and transmitting the WLAN AP response signal through the AP scanning channel after the offset time passes.

The setting of the AP scanning channel may include: receiving information on the AP scanning channel from an AP management entity; and setting the AP scanning channel by using the information on the AP scanning channel.

The setting of the AP scanning channel may further include transmitting at least one of Service Set Identifiers (SSIDs) of WLAN APs and information on the data transmission/reception channel to the AP management entity.

The WLAN AP response signal may further include information on the data transmission/reception channel of the WLAN AP.

The transmitting of the WLAN AP response signal may include: setting a back-off time; and transmitting the WLAN AP response signal through the AP scanning channel after the back-off time and the offset time pass.

In order to achieve the objects, a communication method of an Access Point (AP) management entity according to an embodiment of the present invention may include: collecting information on Wireless Local Area Network (WLAN) APs within an area of the AP management entity from a User Equipment (UE) or the WLAN APs; extracting an AP scanning channel which is a channel for discovering the WLNA APs by using the collected information on the WLAN APs; and transmitting information on the AP scanning channel to the UE and the WLAN APs.

The information on the WLAN APs may include at least one of Service Set Identifiers (SSIDs) of the WLAN APs and information on a data transmission/reception channel.

The communication method may further include: receiving, from the UE, channel busy information indicating that the WLAN AP discovery signal has not been transmitted by the UE within a preset time; and extracting a new AP scanning channel by using the received channel busy information.

The AP management entity may be a base station.

In order to achieve the objects, a User Equipment (UE) may include: a communication unit for communicating with an Access Point (AP) management entity and a Wireless Local Area Network (WLAN) AP; and a controller for making a control to switch a channel to an AP scanning channel which is a channel for discovering the WLAN AP between the UE and the WLAN AP, to transmit a WLAN AP discovery signal in the AP scanning channel, to receive, from the WLAN AP, a WLAN AP response signal transmitted after an offset time set according to a load state of the WLAN AP passes, and to switch the channel to a data transmission/reception channel for data communication with the WLAN AP.

In order to achieve the objects, a Wireless Local Area Network (WLAN) Access Point (AP) may include: a communication unit for communicating with an AP management entity and a User Equipment (UE); and a controller for making a control to set an AP scanning channel which is a channel for discovering the WLAN AP between the UE and the WLAN AP, to set an offset time according to a load state of the WLAN AP, to receive a WLAN AP response signal from the UE through the AP scanning channel, and to transmit the WLAN AP response signal through the AP scanning channel after the offset time passes.

In order to achieve the objects, an Access Point (AP) management entity may include: a communication unit for communication with a Wireless Local Area Network (WLAN) AP and a User Equipment (UE); and a controller for making a control to collect information on WLAN APs within an area of the AP management entity from the UE or the WLAN APs, to extract an AP scanning channel which is a channel for discovering the WLNA APs by using the collected information on the WLAN APs, and to transmit information on the AP scanning channel to the UE and the WLAN APs.

Advantageous Effects of Invention

Through a method of discovering a WLAN AP according to the present invention, a UE can always select an AP having a lightest load by discovering all neighboring WLAN APs.

Compared to the conventional scheme, the UE can significantly reduce a WLAN AP scanning time to decrease power consumption and improve WLAN service use quality.

A mobile communication service provider can easily provide a load-balanced WLAN service through a cellular BS.

Cellular traffic can be efficiently offloaded through a WLAN.

Effects obtainable from the present invention may not be limited to the above mentioned effects, and other effects which are not mentioned may be clearly understood, through the following descriptions, by those skilled in the art of the present invention.

BRIEF DESCRIPTION OF THE DRAWINGS

FIG. 8 illustrates an example of information on a data transmission/reception channel according to an embodiment of the present invention;

MODE FOR THE INVENTION

In describing the present disclosure below, a detailed description of related known configurations or functions incorporated herein will be omitted when it is determined that the detailed description thereof may unnecessarily obscure the subject matter of the present disclosure. Hereinafter, embodiments of the present disclosure will be described with reference to the accompanying drawings. The terms which will be described below are terms defined in consideration of the functions in the present disclosure, and may be different according to users, intentions of the users, or customs. Accordingly, the terms should be defined based on the contents over the whole present specification.

Figure 1:
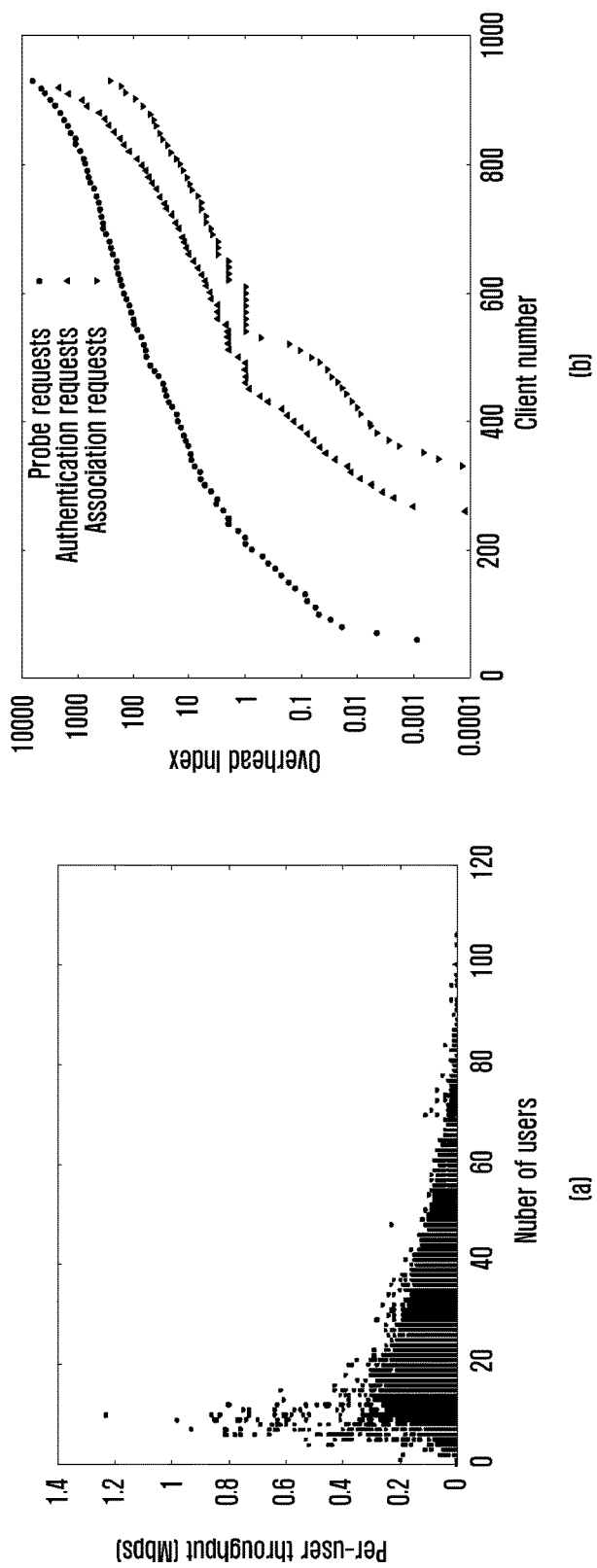
FIG. 1 illustrates a relation between throughput and overload of UEs according to the number of UEs which access one WLAN AP.
Figure 2:
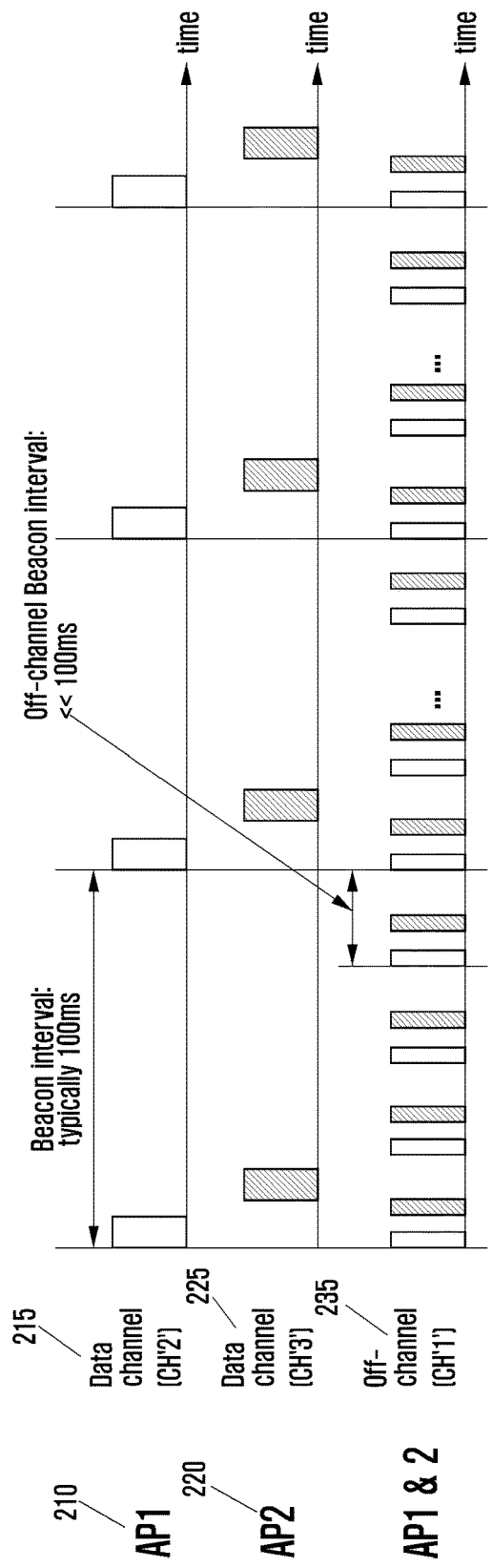
FIG. 2 illustrates an example of a method of discovering a WLAN AP according to conventional passive scanning.

FIG. 2 illustrates an example of a method of discovering a WLAN AP according to conventional passive scanning.

Referring to FIG. 2, in the method of discovering the WLAN Access Point (AP) according to the passive scanning, the AP periodically transmits a beacon frame. For example, a first AP 210 may periodically transmit a beacon frame at an interval of 100 ms in its own data channel 215 while using channel 2 (CH2) 215 as the data channel. Further, a second AP 220 may periodically transmit a beacon frame at an interval of for example, 100 ms in its own data channel 225 while using channel 3 (CH3) 225 as the data channel.

In this case, the first AP 210 and the second AP 220 may have an off channel 235 as a common channel dedicated for beacon frame transmission independently from the channels 215 and 225 for actual data transmission. For example, in FIG. 2, channel 1 (CH1) other than the data channels including channel 2 and channel 3 used by the first AP 210 and the second AP 220, respectively, may be preset as the off channel. Further, the first AP 210 and the second AP 220 may additionally transmit the beacon frame through the off channel 235. At this time, the beacon frame, which is transmitted through the off channel 235, may be transmitted on a period shorter than a transmission period (100 ms in the example illustrated in FIG. 2) of the beacon frame, which is transmitted in the data channels 215 and 225.

As described above, when the first AP 210 and the second AP 220 transmit the beacon frame through the off channel 235 on the short period, the beacon frame is periodically transmitted in the off channel 235 even in an unnecessary case, so that the channel may be wasted due to the transmission of the beacon frame.

Accordingly, the UE should be able to scan for all neighboring WLAN APs to select an AP having a lightest load and power consumption of the UE for scanning for the WLAN AP should be able to be minimized. That is, the UE should be able to find the AP having a light load within a short time. Further, a service provider should be able to accurately inform the UE of the AP having the lightest load and provide a load-controlled WLAN service.

Figure 3:
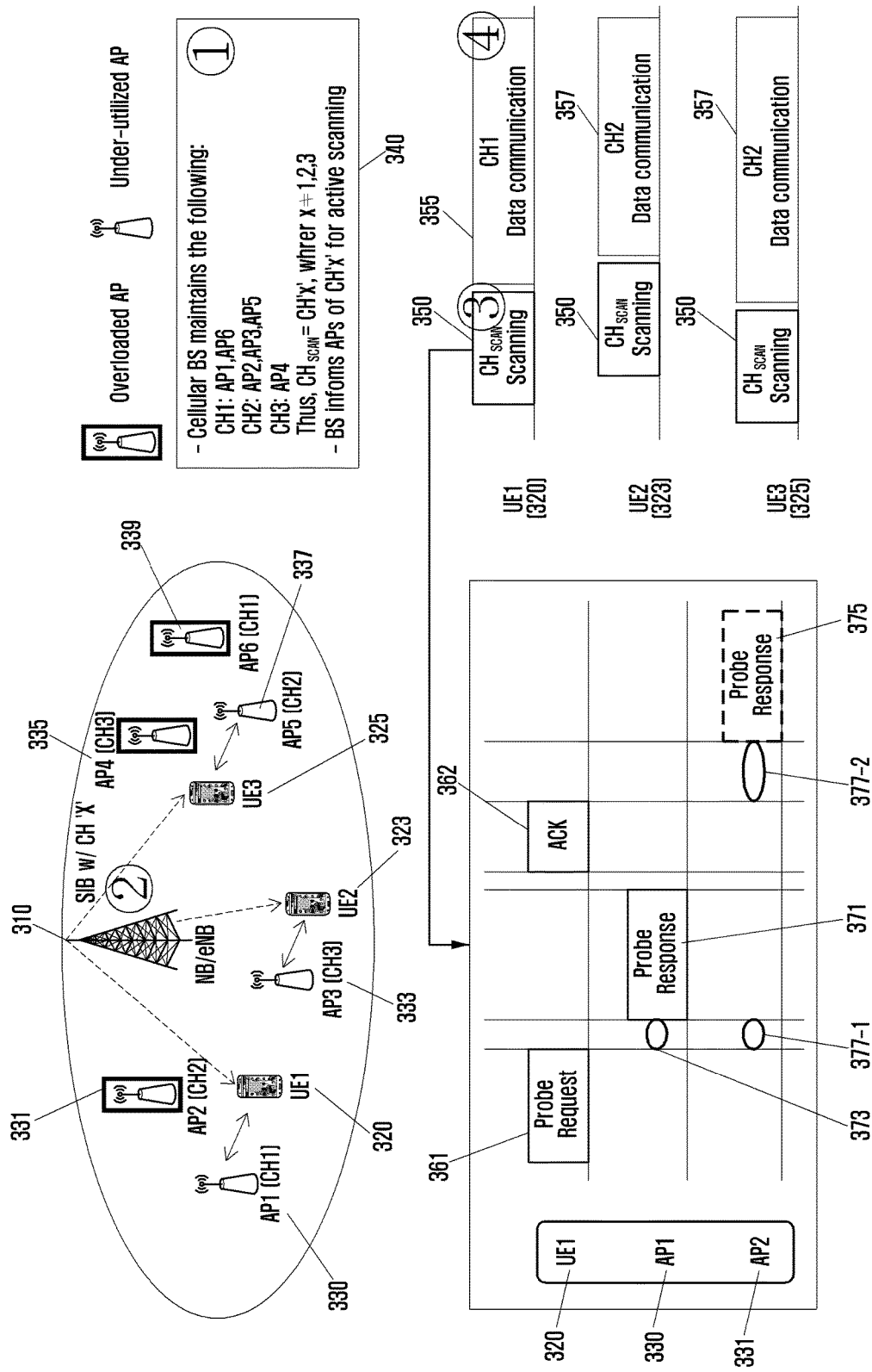
FIG. 3 schematically illustrates an example of a WLAN AP scanning method according to an embodiment of the present invention.
Figure 4:
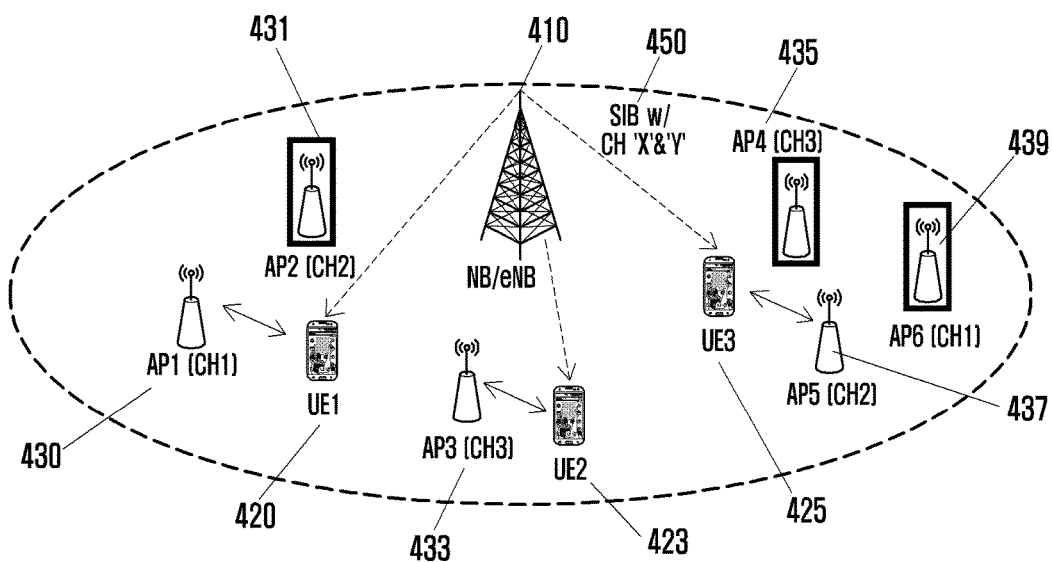
FIGS. 4 and 5 schematically illustrate examples of another method of selecting an AP scanning channel according to an embodiment of the present invention.
Figure 5:
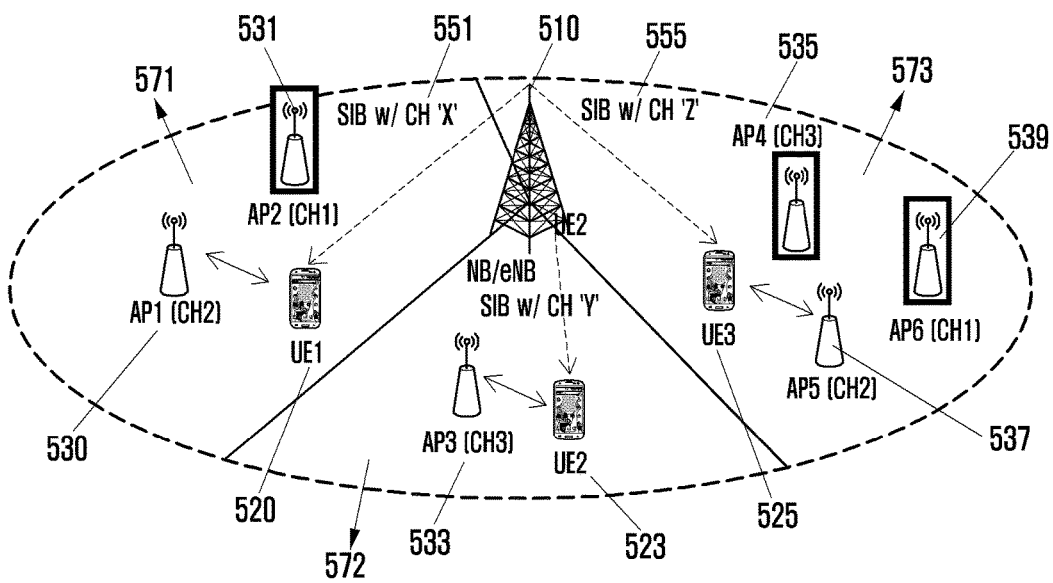
Figure 6:
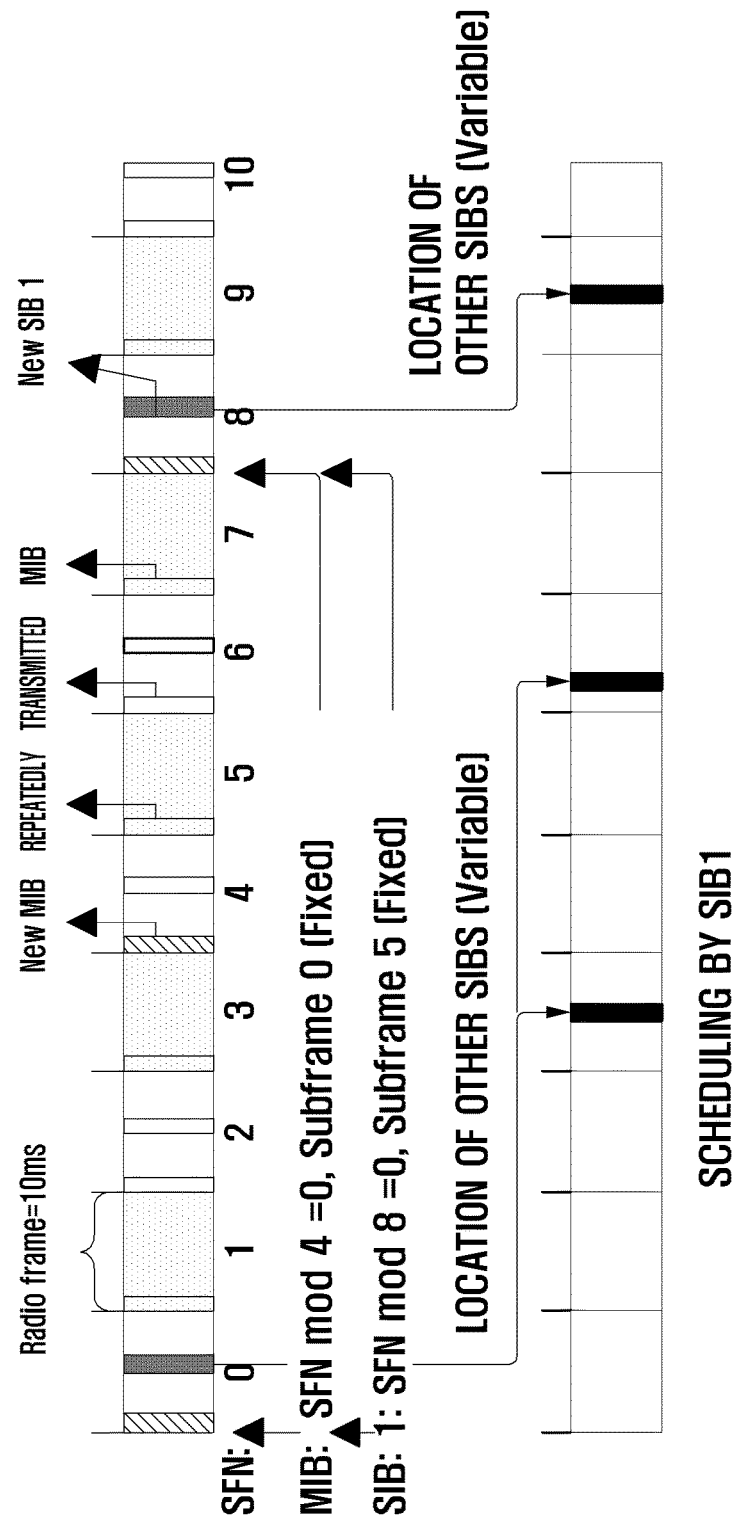
FIG. 6 illustrates an example of a method of transmitting an AP scanning channel according to an embodiment of the present invention.
Figure 7:
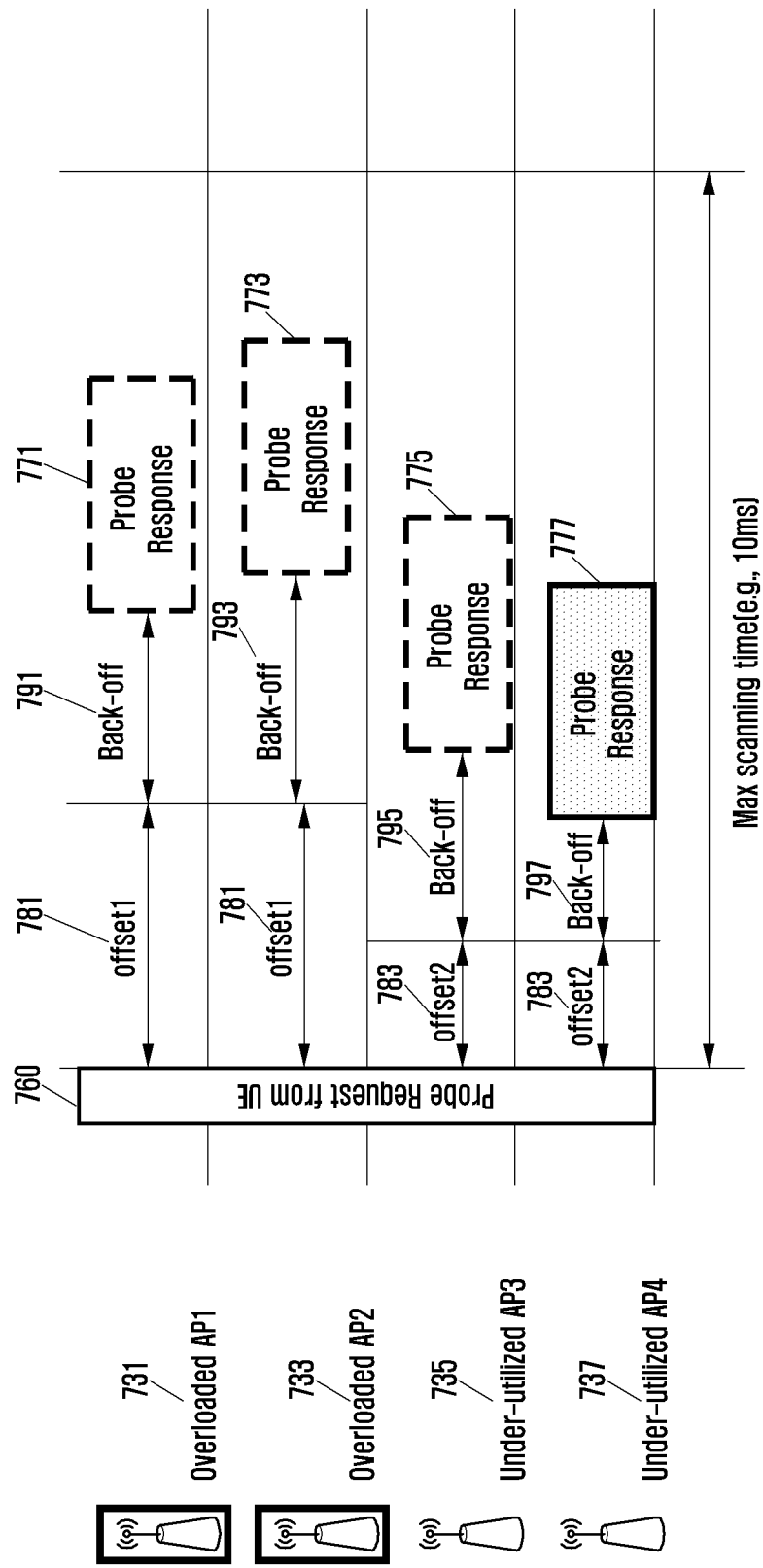
FIG. 7 illustrates an example of a method of transmitting a probe response frame by the WLAN AP according to an embodiment of the present invention.

FIG. 3 schematically illustrates an example of a WLAN AP scanning method according to an embodiment of the present invention, FIGS. 4 and 5 schematically illustrate examples of another method of selecting an AP scanning channel according to an embodiment of the present invention, FIG. 6 illustrates an example of a method of transmitting an AP scanning channel according to an embodiment of the present invention, FIG. 7 illustrates an example of a method of transmitting a probe response frame by a WLAN AP according to an embodiment of the present invention, and FIG. 8 illustrates an example of information on a data transmission/reception channel according to an embodiment of the present invention.

Referring to FIG. 3, one or more WLAN APs 330, 331, 333, 335, 337, and 339 may exist. Further, in order to select and access a WLAN AP having the lightest load from the WLAN APs, each of the one or more UEs 320, 323, and 325 may scan for WLAN APs. At this time, it is assumed that the second AP 331, the fourth AP 335, and the fifth AP 339 correspond to overloaded APs or APs having more loads compared to the remaining APs. Whether the AP has a large load or not may be determined based on the number of UEs, which access the WLAN AP, an actual channel utilization ratio, a collision ratio, the number of waiting packets, a waiting time of a packet, and the like.

At this time, an AP management entity 310 that manages APs may collect information (configuration of) on APs from the APs 330, 331, 333, 335, 337, and 339. According to some embodiments, the information on the AP may include at least one piece of static configuration information including a Service Set IDentifier (SSID) of each of the WLAN APs 330, 331, 333, 335, 337, and 339, a channel used for data communication by each of the WLAN APs 330, 331, 333, 335, 337, and 339, and the like. For example, as indicated by reference numeral 340 of FIG. 3, the AP management entity 310 may collect an SSID of the first AP 330 and information indicating that CH1 is used for data communication, an SSID of the second AP 331 and information indicating that CH2 is used for data communication, an SSID of the third AP 333 and information indicating CH2 is used for data communication, and the like. Further, the AP management entity 310 may collect an SSID of the fourth AP 335 and information indicating that CH3 is used for data communication, an SSID of the fifth AP 337 and information indicating that CH2 is used for data communication, an SSID of the sixth AP 339 and information indicating CH1 is used for data communication, and the like.

In this case, according to some embodiments, the AP management entity 310 may be at least one of a Base Station (BS), a Mobility Management Entity (MME), an AP controller, and the like. For example, when the AP management entity 310 is the BS, the BS 310 may collect static configuration information such as SSIDs and channels of the WLAN APs 330, 331, 333, 335, 337, and 339 existing in its own coverage.

According to some embodiments, the static configuration information on the WLAN APs 330, 331, 333, 335, 337, and 339 may be collected by the UEs 320, 323, and 325, and transmitted to the AP management entity 310. For example, the first UE 320 may collect the SSIDs and information on used channels of the first AP 330 and the second AP 331 and transmit the collected SSIDs and information to the AP management entity 310. As described above, when the UEs 320, 323, and 325 collect the SSIDs and channel information on the WLAN APs and inform the AP management entity 310 of the SSIDs and the channel information, the UEs 320, 323, and 325 may collect information on all the APs 330, 331, 333, 335, 337, and 339 measured by the UEs 320, 323, and 325 but, at this time, there is a demand on the UEs 320, 323, and 325 for some energy consumption. However, since the collected information on the APs is the static configuration information, the UEs are not required to frequently collect the information, so that the AP management entity 310 may acquire the information on the APs UEs 330, 331, 333, 335, 337, and 339 without giving a big influence to the UEs.

Alternatively, the static configuration information on the WLAN APs 330, 331, 333, 335, 337, and 339 may be directly collected by the AP management entity 310 from each of the APs through the AP or a wireless or wired interface. In this case, the AP management entity 310 may efficiently collect the static configuration information on the APs without additional energy consumption of the UE.

After collecting the static configuration information on the WLAN APs 330, 331, 333, 335, 337, and 339 within its own coverage, the AP management entity 310 may extract an AP scanning channel (CH_SCAN) 350 as a specific channel for discovering the WLAN AP based on the information. At this time, the AP scanning channel 350 is a channel set for active scanning between the UEs 320, 323, and 325, and the WLAN APs 330, 331, 333, 335, 337, and 339.

According to some embodiments, the AP management entity 310 may preset a specific channel as the AP scanning channel 350. In this case, a channel, which is not frequently used among WLAN frequencies, may be pre-selected as the AP scanning channel 350. For example, channel 14 may be preset as the AP scanning channel 350 in a band of 2.4 GHz and channel 140 may be preset as the AP scanning channel 350 in a band of 5 GHz.

Further, according to some embodiments, a specific channel may be preset as the AP scanning channel 350 between the WLAN APs 330, 331, 333, 335, 337, and 339 and the UEs 320, 323, and 325. In this case, according to some embodiments, the AP management entity 310 may perform the active scanning described below through the set specific channel between the WLAN APs and the UEs without the process of collecting the AP information on the APs. Further, when the UE fails in discovering the WLAN AP although the active scanning is performed through the set specific channel between the WLAN APs and the UEs, the AP management entity 310 may extract a new AP scanning channel 350 based on the information on the WLAN APs.

Alternatively, according to some embodiments, the AP scanning channel 350 may be dynamically set. For example, a channel, which is not used by the WLAN APs 330, 331, 333, 335, 337, and 339, may be set as the AP scanning channel 350. In the embodiment of FIG. 3, channel 1 is used by the first AP 330 and the sixth AP 339, channel 2 is used by the second AP 331, the third AP 333, and the fifth AP 337, and channel 3 is used by fourth AP 335. Therefore, the AP management entity 310 may set a channel except for channel 1, channel 2, and channel 3, which are used by the APs, for example, channel 4 as the AP scanning channel 350.

When it is determined that all channels are used, the AP management entity 310 may preferentially select a channel, which is used by the smallest number of APs, as the AP scanning channel 350. For example, a channel used by an AP which the smallest number of UEs access, a channel used by an AP having a smallest service area, or a channel having a lightest load may be selected as the AP scanning channel 350. In the example of FIG. 3, since channel 1 is used by two APs, channel 2 is used by three APs, and channel 3 is used only by one AP (the fourth AP 335), the AP management entity 310 may select channel 3 as the AP scanning channel 350.

According to some embodiments, in the setting of the AP scanning channel 350 by the AP management entity 310, the setting may be re-performed to select another channel when a predetermined condition is met. For example, the UEs 320, 323, and 325 may scan for the WLAN APs through the set AP scanning channel 350. At this time, if the AP scanning channel 350 is busy due to the use by another WLAN AP or the like, the UEs 320, 323, and 325 may not transmit a probe request frame within a particular time. At this time, the UEs 320, 323, and 325 may transmit channel busy information to the AP management entity 310. Thereafter, the AP management entity 310 may set another channel as the AP scanning channel according to the channel busy information. The channel busy information may include information on a busy channel and a reason why the channel is busy.

Meanwhile, referring to FIG. 4, according to some embodiments, the AP management entity 410 may select two or more AP scanning channels 450.

For example, as illustrated in FIG. 4, the AP management entity 410 may collect information on each of the WLAN APs 330, 331, 333, 335, 337, and 339 and select CH X and CH Y as the scanning channels 450. In this case, even when the AP scanning fails in one channel, the UE may search for an optimal WLAN AP which the UE can access within a short time by attempting the AP scanning in another channel without a process of resetting the AP scanning channel as described above.

Further, referring to FIG. 5, the AP management entity 510 may divide its own coverage into a plurality of sectors and select an AP scanning channel 551, 553, and 555 according to each sector 571, 573, or 575. To this end, the AP management entity 510 may collect information on the APs according to each of the sectors 571, 573, and 575. Alternatively, the AP management entity 510 may select the AP scanning channel 551, 553, and 555 in a manner of storing the collected information on the APs according to each of the divided sectors 571, 573, and 575. In the division of the sectors, the coverage of the AP management entity 510 may be divided at a preset ratio or in consideration of locations or an existence ratio of the UEs within the coverage of the AP management entity 510.

For example, as illustrated in FIG. 5, the AP management entity 510 may collect SSIDs of the first AP 530 and the second AP 531 channel information used for data transmission in the first area 571. Further, the AP management entity 510 may select a channel, for example, channel 3, which is not used by the first AP 530 and the second AP 531, as the AP scanning channel 551 of the first sector 571. Similarly, the AP management entity 510 may select a channel, which is not used by the third AP 533, as the AP scanning channel 553 in the second sector 573 and a channel, which is not used by the fourth AP 535, fifth AP 537, and the sixth AP 539, as the AP scanning channel 555 in the third sector 575.

By setting different AP scanning channels according to each sector, it is possible to more accurately distribute AP scanning channels to the respective sectors.

Referring back to FIG. 3, the AP management entity 310 may transmit information on the determined AP scanning channel 350 to each of the WLAN APs 330, 331, 333, 335, 337, and 339, and the UEs 320, 323, and 325. At this time, when the AP management entity 310 is the AP controller, the AP controller may set the AP scanning channel 350, and then transmit the AP scanning channel 350 to the UEs 320, 323, and 325 through the BS.

Meanwhile, referring to FIG. 6 when the BS 310 transmits information on the AP scanning channel 350 to the UEs 320, 323, and 325 connected to the BS 310, the BS 10 may use a method of inserting the information into a message required for transmitting system information, for example, a System Information Block (SIB) and broadcasting the message in order to allow all the UEs 320, 323, and 325 to simultaneously receive the information. Further, when the UE initially accesses the BS 310 or performs a handover, the BS 310 may transmit information on the AP scanning channel 350 to the UE through unicast transmission. As described above, when the BS 310 transmits the information on the AP scanning channel 350 to the UE, the BS 310 hardly has a burden for transmitting the information on the AP scanning channel 350 through a cellular channel since 1 byte is enough (based on one channel) for the information on the AP scanning channel 350.

Referring back to FIG. 3, the WLAN APs 330, 331, 333, 335, 337, and 339 may receive the AP scanning channel 350 from the AP management entity 310 and set the AP scanning channel (CH_SCAN) 350 for the active scanning independently from the conventionally set channel for data transmission. In this case, according to some embodiments, since the WLAN APs 330, 331, 333, 335, 337, and 339 have two or more transceivers, the WLAN APs 330, 331, 333, 335, 337, and 339 may further set the AP scanning channel 350 in addition to the channel for the data transmission. Meanwhile, as described in the part related to FIG. 4, when the WLAN APs 430, 431, 433, 435, 437, and 439 receive information on two or more AP scanning channels 450 from the AP management entity 410, the WLAN APs 430, 431, 433, 435, 437, and 439 may further have transceivers for managing the respective AP scanning channels 450.

Further, the UEs 320, 323, and 325 may perform a process of discovering the WLAN AP after receiving the information on the AP scanning channel 350 from the AP management entity 310. For example, when discovering the WLAN AP, the UEs 320, 323, and 325 may first turn on a WLAN interface and change the channel into the AP scanning channel 350. Further, the UEs 320, 323, and 325 may perform the active scanning through the changed AP scanning channel 350. That is, the UEs 320, 323, and 325 may transmit a WLAN AP discovery signal 361 through the AP scanning channel 350. According to some embodiments, the WLAN AP discovery signal may be a probe request frame 361. Hereinafter, for convenience of the description, the WLAN AP discovery signal and the probe request frame may be interchangeably used.

Meanwhile, when the WLAN APs 330, 331, 333, 335, 337, and 339 receive the probe request frame 361 from the UEs 320, 323, and 325 through the AP scanning channel 350, the WLAN APs 330, 331, 333, 335, 337, and 339 may transmit WLAN AP response signals 371 and 375 to the UEs 320, 323, and 325. According to some embodiments, the WLAN AP response signals may be probe response frames 371 and 375. Hereinafter, for convenience of the description, the WLAN AP response signal and the probe response frame may be interchangeably used. Meanwhile, according to some embodiments, when the probe request frame 361 transmitted by the UEs 320, 323, and 325 is received, the transceiver to which the AP scanning channel 350 for the active scanning is allocated may transmit the probe response frames 371 and 375 to the UEs.

At this time, the WLAN APs 330, 331, 333, 335, 337, and 339 may set offset values 373 and 377 according to their own load states. Further, the WLAN APs 330, 331, 333, 335, 337, and 339 may transmit probe response frames after their offset times pass. For example, as the load is larger, a larger offset may be set. In a case of an AP having a large load, transmission of the probe response frame is relatively further delayed compared to an AP having a light load. Accordingly, an AP having a light load among the WLAN APs having received the probe request frame from a particular UE can first transmit the probe response frame to the UE, and thus the UE can select the AP having the lightest load.

According to some embodiments, each of the WLAN APs 330, 331, 333, 335, 337, and 339 may pre-store an offset size according to the load state in a table form. Further, the WLAN APs 330, 331, 333, 335, 337, and 339 may search the offset table and set offset sizes according to their load states.

According to some embodiments, the offset values may be set according to the number of divisions of the load states of the WLAN APs 330, 331, 333, 335, 337, and 339. For example, the load states of the WLAN APs 330, 331, 333, 335, 337, and 339 may be divided into two cases where the load state is higher and lower than a preset threshold. In this case, the offset values may have two values according to the high load state and the low load state. Further, according to some embodiments, the load states of the WLAN APs 330, 331, 333, 335, 337, and 339 may be determined by a policy of a service provider. For example, the determination is made based on the number of UEs, which access the WLAN AP, an actual channel utilization ratio, a collision ratio, the number of waiting packets, a waiting time of a packet, and the like.

For example, the first UE 320 may transmit the probe request frame 361 in the AP scanning channel 350. Thereafter, the first AP 330 having received the probe request frame 361 and the second AP 331 may transmit probe response frames 371 and 375 to the first UE 320 after a time corresponding to offset values 373 and 377 according to their load states passes. At this time, since the second AP 331 is the overloaded AP as described above, the offset 377 of the second AP 331 may be set to be larger than the offset 373 of the first AP 330. The offset time 373 of the first AP 330 ends earlier than the offset time 377 of the second AP 331, so that the first AP 330 transmits the probe response frame 371 to the first UE 320 after its own offset time 373 passes. Further, the first UE 320 having received the probe response frame 371 from the first AP 330 may transmit an ACK frame 362 to the first AP 330. Thereafter, the first UE 320 may be connected to the first AP 330 to perform data transmission/reception.

At this time, after receiving the probe request frame 361 from the first UE 320, the second AP 331 waits for an offset time 377-1, which is the same as the offset time of the first AP 330, without transmitting the probe response frame. Further, since the offset time 373 of the first AP 330 ends earlier and the AP scanning channel 350 is used while the first AP 330 transmits the probe response frame 371 to the first UE 320, the offset time 377 of the second AP 331 does not pass. In addition, the AP scanning channel 350 can be used after the first UE 320 transmits the ACK 362 to the first AP 330, so that the second AP 331 may transmit the probe response frame 375 to the first UE 320 after the remaining offset time 377-2 of the second AP 331 passes and the offset time 377 ends. At this time, the transmission of the probe response frame 375 by the second AP 331 may be cancelled and end together with the transmission of the probe response frame 371 by the first AP 330. Alternatively, even though the first UE 320 receives the probe response frame 375 from the second AP 331, the first UE 320 may be set to ignore the probe response message.

Meanwhile, according to some embodiments, the WLAN APs 330, 331, 333, 335, 337, and 339 may additionally set a back-off time in order to prevent collision of the probe response frames between the WLAN APs 330, 331, 333, 335, 337, and 339 having the same load states. The back-off time is a randomly selected value, which is set for each of the WLAN APs 330, 331, 333, 335, 337, and 339, rather than a value determined according to the load states of the WLAN APs 330, 331, 333, 335, 337, and 339. For example, the WLAN APs 330, 331, 333, 335, 337, and 339 may select a random number among numbers 0 to 15 and set a back-off time corresponding to the selected number as the back-off time to transmit their probe response frames.

Referring to FIG. 7, FIG. 7 illustrates an example of a method of transmitting probe response frames by WLAN APs 731, 733, 735, and 737 when load states of the WLAN APs 731, 733, 735, and 737 are divided into two cases where the load state is higher and lower than a preset threshold. According to the above, a first AP 731 and a second AP 733 are APs in a high load state (for example, overloaded state), and a third AP 735 and a fourth AP 737 may be APs in a low lad state. In the embodiment of FIG. 7, the load states are divided into two cases, so that the first AP 731 and the second AP 733 may have the same first offset 781. Further, the third AP 735 and the fourth AP 737 in the low state may also have the same second offset 783.

At this time, since the first AP 731 and the second AP 733 have the first same offset 781, when the first AP 731 and the second AP 733 transmit probe response frames after receiving a probe request frame from the UE, collision may occur between the first AP 731 and the second AP 733. Similarly, collision may occur between transmissions of the probe response frames of the third AP 735 and the fourth AP 737 Accordingly, the WLAN APs 731, 733, 735, and 737 may set random back-off times 791, 793, 795, and 797. For example, since the back-off time of the first AP 731 may be differently set from the back-off time 793 of the second AP 733, the collision may be prevented between the transmissions of the probe response frames of the first AP 731 and the second AP 733.

In this case, a time for which the AP may be maximally delayed may be set within a max scanning time, which is a maximally allowable time preset to the UE for the scanning.

Meanwhile, according to some embodiments, a sum of the offset time and the back-off time of the WLAN AP in the low load state may be set to be always smaller than a sum of the offset time and the back-off time of the WLAN AP in the high load state.

Referring back to FIG. 3, when the WLAN APs 330, 331, 333, 335, 337, and 339 transmit the probe response frames to the UEs 320, 323, and 325 through the AP scanning channel 350, the WLAN APs 330, 331, 333, 335, 337, and 339 may transmit information on data transmission/reception channels of the WLAN APs themselves to the UEs 320, 323, and 325.

According to some embodiments, as illustrated in FIG. 8, the WLAN APs 330, 331, 333, 335, 337, and 339 may insert the information on the data transmission/reception channels into the probe response frames as an element of "Channel Switch Announcement" defined in the standard 802.11 and transmit the probe response frames to the UEs 320, 323, and 325. Thereafter, the UEs 320, 323, and 325 having received the information on the data transmission/reception channels may immediately change their own channels into the data transmission/reception channels, perform a connection process for data transmission/reception with the corresponding AP, and transmit/receive data.

For example, the first AP 330 having received the probe request frame of the first UE 320 through channel 4 corresponding to the AP scanning channel 350 may transmit the probe response frame 371 to the first UE 320 through channel 4 350 after the offset time 373 according to the load state of the first AP 330 has passed. At this time, the first AP 330 may also transmit information on channel 1 355 corresponding to the data transmission/reception channel of the first AP 330 to the first UE 320. At this time, the first AP 330 may insert a Channel Switch Announcement into the probe response frame 371 and transmit the probe response frame 371 to the first UE 320. Thereafter, the first UE 320 switches its own channel to channel 1 355 and transmits/receives data to/from the first AP 330.

Meanwhile, in the data transmission/reception channels 355 and 357 (CH_DATA) of the WLAN APs 330, 331, 333, 335, 337, and 339, basic operations of the APs are performed. At this time, according to some embodiments, the WLAN APs 330, 331, 333, 335, 337, and 339 periodically transmit the beacon frames in the data transmission/reception channels 355 and 357 to allow the UE to identify the existence of the WLAN APs through a passive scanning method.

According to some embodiments, when the UEs 320, 323, and 325 have not received the probe response frames during a preset max scanning time (for example, 10 ms), the UEs 320, 323, and 325 may determine that there is no WLAN AP. In this case, the UEs 320, 323, and 325 may attempt to scan for the WLAN APs again later.

Meanwhile, as described in the part related to FIG. 4, when two or more AP scanning channels 450 are set according to some embodiments, the UEs 420, 423, and 425 may discover the WLAN AP by performing the active scanning for discovering the AP in the first channel. Further, when the UEs 420, 423, and 425 have not received the probe response frames during the preset max scanning time, the UEs 420, 423, and 425 may switch the channel to the second channel and discover the WLAN AP again. In this case, as described above, the WLAN APs 430, 431, 433, 435, 437, and 439 may include a plurality of transceivers for the first channel and the second channel for discovering the WLAN AP and their own data transmission/reception channels.

According to some embodiments, since the AP scanning channel 350 is busy due to the use by another WLAN AP or the like, the UEs 320, 323, and 325 may not transmit the probe request frames within a preset time. In this case, the UEs 320, 323, and 325 may transmit channel busy information to the AP management entity 310. According to some embodiments, the channel busy information may be a one-bit identifier. Thereafter, the AP management entity 310 may set another channel as the AP scanning channel according to the channel busy information. At this time, the UEs 320, 323, and 325 may set a small offset compared to a data frame to allow the probe request frame to be first transmitted (for example, use 802.11e).

Meanwhile, when the UEs 320, 323, and 325 have not transmitted the probe request frames within the preset time and thus transmit the channel busy information to the AP management entity 310, the UEs 320, 323, and 325 may additionally perform general passive scanning. That is, the UEs 320, 323, and 325 may allow the existence of the WLAN APs by receiving the beam frames periodically transmitted by the WLAN APs 330, 331, 333, 335, 337, and 339 in their data channels.

Based on a schematic example operation for the AP discovery scanning of the UE according to an embodiment of the present invention, six WLAN APs 330, 331, 333, 335, 337, and 339 are installed in the coverage of the AP management entity 310, for example, the BS 310. Further, when the three UEs 320, 323, and 325 newly use a WLAN service, the BS 310 may manage channels and SSIDs of the WLAN APs 330, 331, 333, 335, 337, and 339 and extract the AP scanning channel 350 for the scanning from the channels and SSIDs. When the AP scanning channel 350 is determined, the BS 310 transmits information on the AP scanning channel 350 to the WLAN APs 330, 331, 333, 335, 337, and 339 and the WLAN APs 330, 331, 333, 335, 337, and 339 set the AP scanning channel 350 for the scanning separately from the channel for data transmission/reception. Thereafter, the BS 310 may insert information on the AP scanning channel 350 into a message request for transmitting system information such as an SIB and broadcast the message to inform the UEs 320, 323, and 325 of the information on the AP scanning channel 350. Thereafter, the UEs 320, 323, and 325 turn on their own WLAN interfaces and switch the channel to the AP scanning channel 350 to perform the active scanning. More specifically, the UEs 320, 323, and 325 transmit the probe request frames and then are in a reception state to receive the probe response frames. Meanwhile, since the second AP 331, the fourth AP 335, and the sixth AP 339 among the six APs are currently in the overloaded state, the first UE 320 first receives the probe response frame from the first AP 330 corresponding to an under-utilized AP, which is not overloaded. Further, the first UE 320 changes the channel to CH 1 for an association process with the first AP 330 and then performs data communication with the first AP 330. Similarly, the second UE 323 and the third UE 325 also receive the probe response frames from the third AP 333 and the fifth AP 337 which are APs having light loads, change the channel to CH2, and then perform data transmission.

Figure 9:
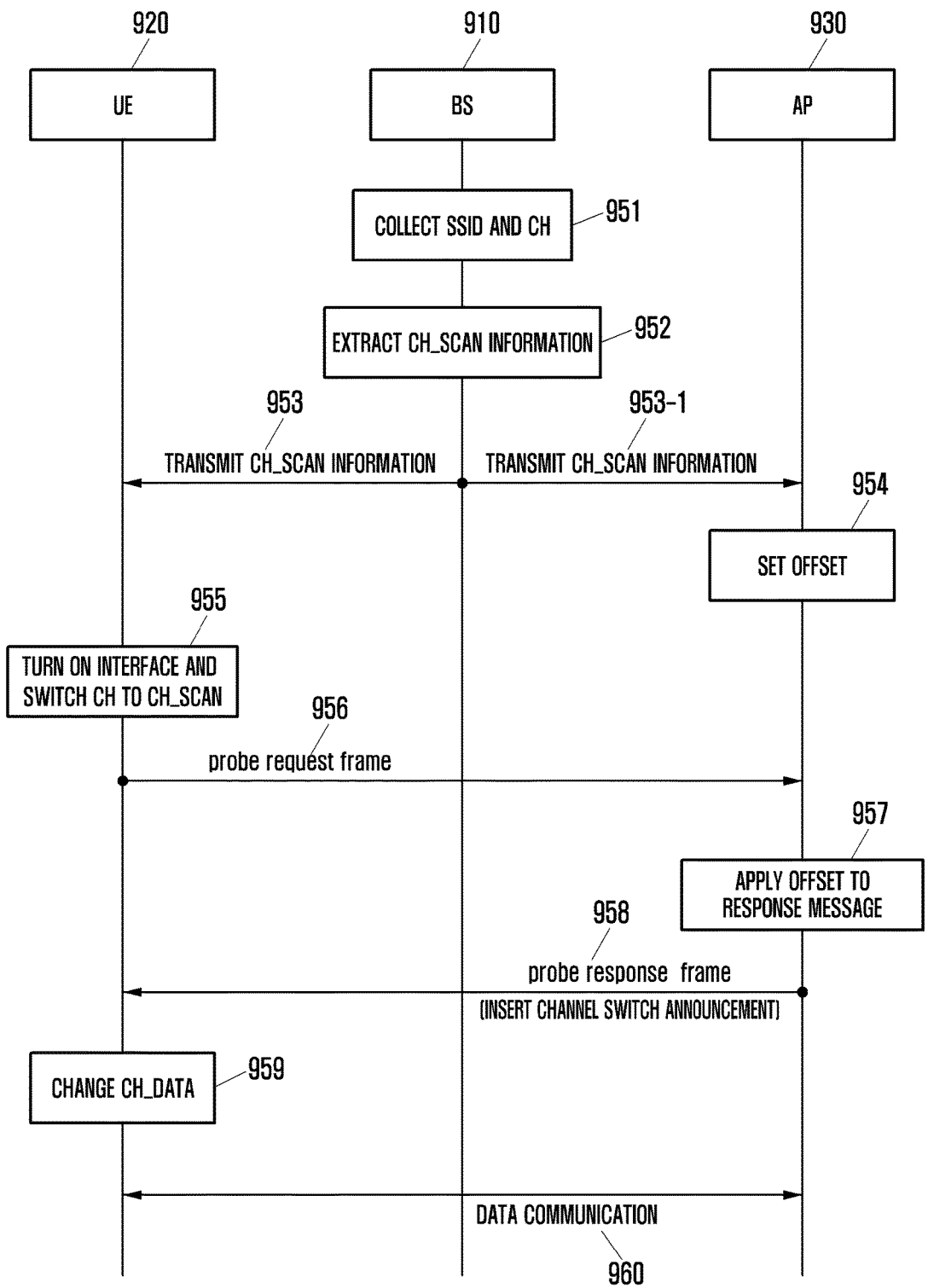
FIG. 9 is a flowchart illustrating a method of discovering a WLAN AP according to an embodiment of the present invention.

FIG. 9 is a flowchart illustrating a method of discovering a WLAN AP according to an embodiment of the present invention.

Referring to FIG. 9, in step 951, an AP management entity 910 may collect information on WLAN APs 930 within a coverage area of the AP management entity 910. At this time, the information on the APs may include at least one piece of static configuration information such as SSIDs of the WLAN APs 930, channels used for data communication by the WLAN APs 930, and the like.

According to some embodiments, the information on the APs may be collected by the UEs 920 and transmitted to the AP management entity 910, or may be directly collected by the AP management entity 910 from the APs 930 through the APs 930 and wireless or wired interfaces. Since the detailed description thereof has been made above, it will be omitted.

Meanwhile, the AP management entity 910 may be at least one of the BS, the MME, and the AP controller.

After collecting the SSID of the AP and the information such as the CHs and the like, the AP management entity 910 may extract an AP scanning channel (CH_SCAN) for discovering the WLAN AP in step 952. The AP scanning channel may be extracted by selecting a channel, which is not used by the AP, or a channel, which is used by a smallest number of APs. Alternatively, a plurality of AP scanning channels may be extracted, or the coverage area of the AP management entity 910 may be divided into a plurality of sectors and AP scanning channels may be selected. Since a detailed method of extracting the AP scanning channel has been described in the parts related to FIGS. 3 to 8, it will be omitted.

Thereafter, in step 953, the AP management entity 910 may transmit information on the AP scanning channel to the UE 920. In this case, the information may be inserted into a message required for transmitting system information such as an SIB or the like and transmitted in a broadcast scheme, or transmitted in a unicast scheme when the UE 920 initially accesses the BS 910 or performs a handover according to some embodiments.

The UE 920 having received the information on the AP scanning channel in step 953 may turn on its own WLAN interface and switch the channel to the AP scanning channel in step 955.

Thereafter, the UE 920 may transmit the probe request frame to the set AP scanning channel in step 956.

Meanwhile, simultaneously with step 953, or before or after step 953, the AP management entity 910 may transmit the information on the AP scanning channel to the WLAN AP 930 in step 953-1.

The WLAN AP 930 may set the AP scanning channel according to the information on the AP scanning channel received in step 953-1, separately from the channel for data transmission/reception. In this case, the WLAN AP 930 may allocate the AP scanning channel to a separate transceiver, which is different from a transceiver to which the data transmission/reception channel is allocated.

Meanwhile, according to some embodiments, a specific channel may be preset as the AP scanning channel between the UE 920 and the WLAN AP 930 without steps 951 to 953-1 in which the AP management entity 910 extracts the AP scanning channel and transmits the information on the AP scanning channel tot the UE 920 and the WLAN AP 930. In this case, the specific channel may be set as the AP scanning channel between the UE 920 and the WLAN AP 930 without involvement of the AP management entity 910.

Further, in step 954, the WLAN AP 930 may set an offset time according to its own load state. At this time, since a detailed method of setting the offset time has been described in the parts related to FIGS. 3 to 8, it will be omitted.

After the UE 920 transmits the probe request frame in step 956, the WLAN AP 930 may apply the offset time set in step 954 to the transmission of the probe response frame. That is, before the offset time passes, the WLAN AP 930 waits without transmitting the probe response frame.

Further, after the set offset time passes, the WLAN AP 930 may transmit the probe response frame to the UE 910 in step 958. At this time, the offset time is determined according to the load state of the WLAN AP 930, so that an offset time of a WLAN AP having a lightest load among many APs is set to be short. Accordingly, the UE 910 may first receive the probe response frame from the WLAN AP 930 having the lightest load and transmit/receive data to/from the WLAN AP 930 having the lightest load in a good transmission environment.

Meanwhile, the probe response frame which the WLAN AP 930 transmits to the UE 920 in step 958 may include information on the data transmission/reception channel of the WLAN AP 930. For example, the probe response frame with a Channel Switch Announcement element may be transmitted to the UE 920. Since a detailed description thereof has been made above, it will be omitted.

The UE 920 having received the probe response frame from the WLAN AP 930 in step 958 changes the channel to the data channel for data transmission/reception to/from the WLAN AP 930 in step 959, and performs data transmission/reception with the WLAN AP 930 in step 960. At this time, the change in the channel to the data transmission/reception channel by the UE may be made through the Channel Switch Announcement element included in the probe response frame.

Figure 10:
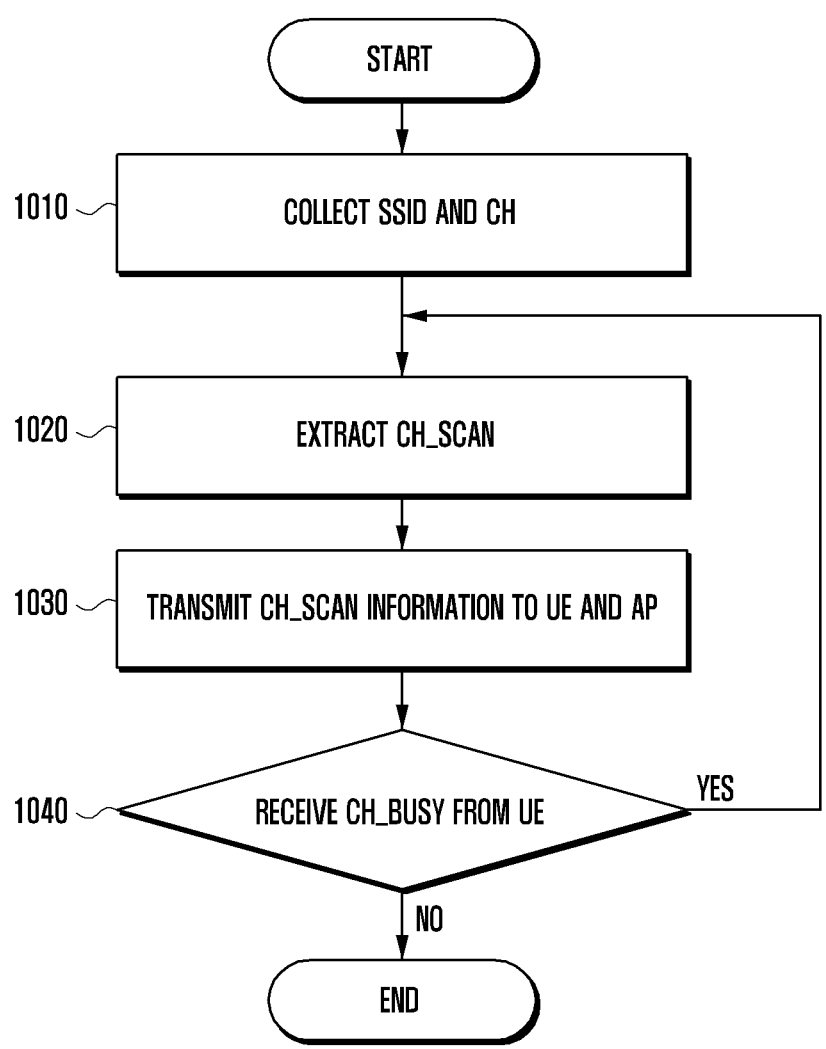
FIG. 10 illustrates an example of a flowchart illustrating operations of the AP management entity according to an embodiment of the present invention.

FIG. 10 illustrates an example of a flowchart illustrating operations of the AP management entity according to an embodiment of the present invention.

Referring to FIG. 10, the AP management entity may collect static configuration information such as SSIDs, data transmission/reception channels, and the like of WLAN APs within the coverage of the AP management entity in step 1010.

Thereafter, in step 1020, the AP management entity may extract an AP scanning channel for AP scanning based on the collected information on the APs. Since a detailed description of the method of extracting the AP scanning channel has been made above, it will be omitted here.

After extracting the AP scanning channel in step 1020, the AP management entity may transmit the AP scanning channel to the UEs and WLAN APs within the coverage of the AP management entity in step 1030.

Thereafter, the AP management entity may determine whether channel busy information is received from the UE in step 1040. For example, although the UE attempts the active scanning through the AP scanning channel extracted in step 1020, the UE cannot transmit the probe request frame within a preset time since the channel is busy due to the use by another WLAN device and the like. At this time, the UE may transmit channel busy information to the AP management entity.

When the AP management entity receives the channel busy information, the AP management entity may proceed to step 1020 to select a new AP scanning channel based on the received channel busy information.

Figure 11:
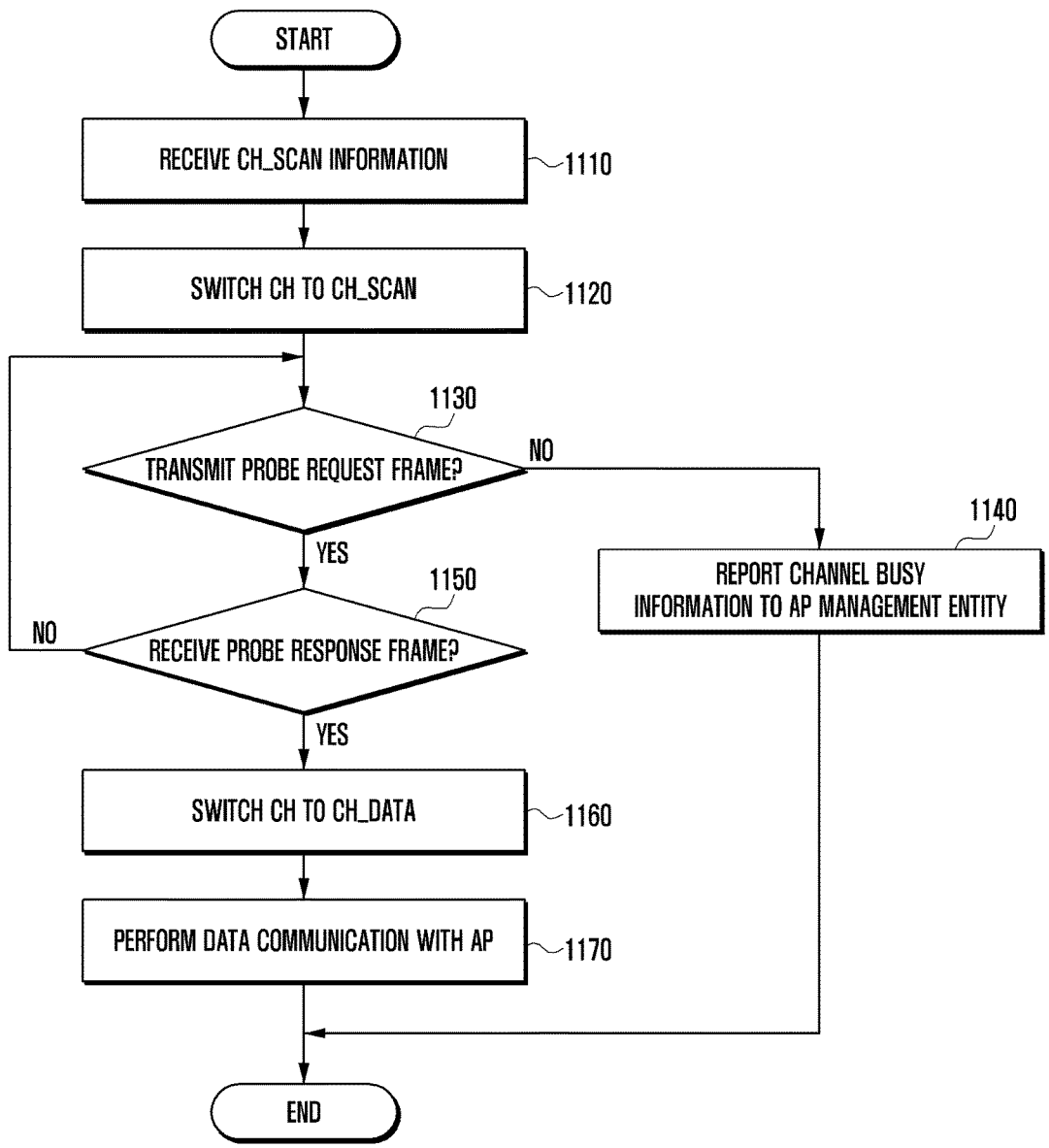
FIG. 11 illustrates an example of a flowchart illustrating operations of the UE according to an embodiment of the present invention.

FIG. 11 illustrates an example of a flowchart illustrating operations of the UE according to an embodiment of the present invention.

Referring to FIG. 11, in step 1110, the UE may receive information on an AP scanning channel from the AP management entity. Further, although not illustrated, the UE may transmit an SSID of the AP and information on a data transmission/reception channel to the AP management entity before step 1110.

According to some embodiments, a specific channel may be preset as the AP scanning channel between the UE and the WLAN AP without the step in which the UE receives the information on the AP scanning channel from the AP management entity. In this case, when the UE requires the WLAN AP scanning, the UE may search for and find information on the preset AP scanning channel in a storage unit.

In step 1120, the UE may turn on a WLAN interface and switch its own channel to the AP scanning channel to perform the active scanning.

At this time, in step 1130, the UE may determine whether the UE may transmit the probe request frame through the AP scanning channel. When the probe request frame cannot be transmitted within a preset time, the UE may transmit channel busy information to the AP management entity in step 1140.

After transmitting probe request frame information through the AP scanning channel in step 1130, the UE may determine whether the probe response frame is received from the AP in step 1150. When the probe response frame is not received within a preset time, the UE may determine that there is no AP and re-perform the scanning in step 1130.

When the UE receives the probe response frame in step 1150, the UE may switch the channel to the data transmission/reception channel for data communication with the WLAN AP having transmitted the corresponding probe response frame in step 1160. At this time, according to some embodiments, the UE may immediately change the channel to the corresponding data transmission/reception channel by using the Channel Switch Announcement element included in the probe response frame.

Thereafter, in step 1170, the UE may perform data communication with the corresponding AP. At this time, according to some embodiments, the UE may periodically transmit/receive a beacon frame for passive scanning in the data transmission/reception channel.

Figure 12:
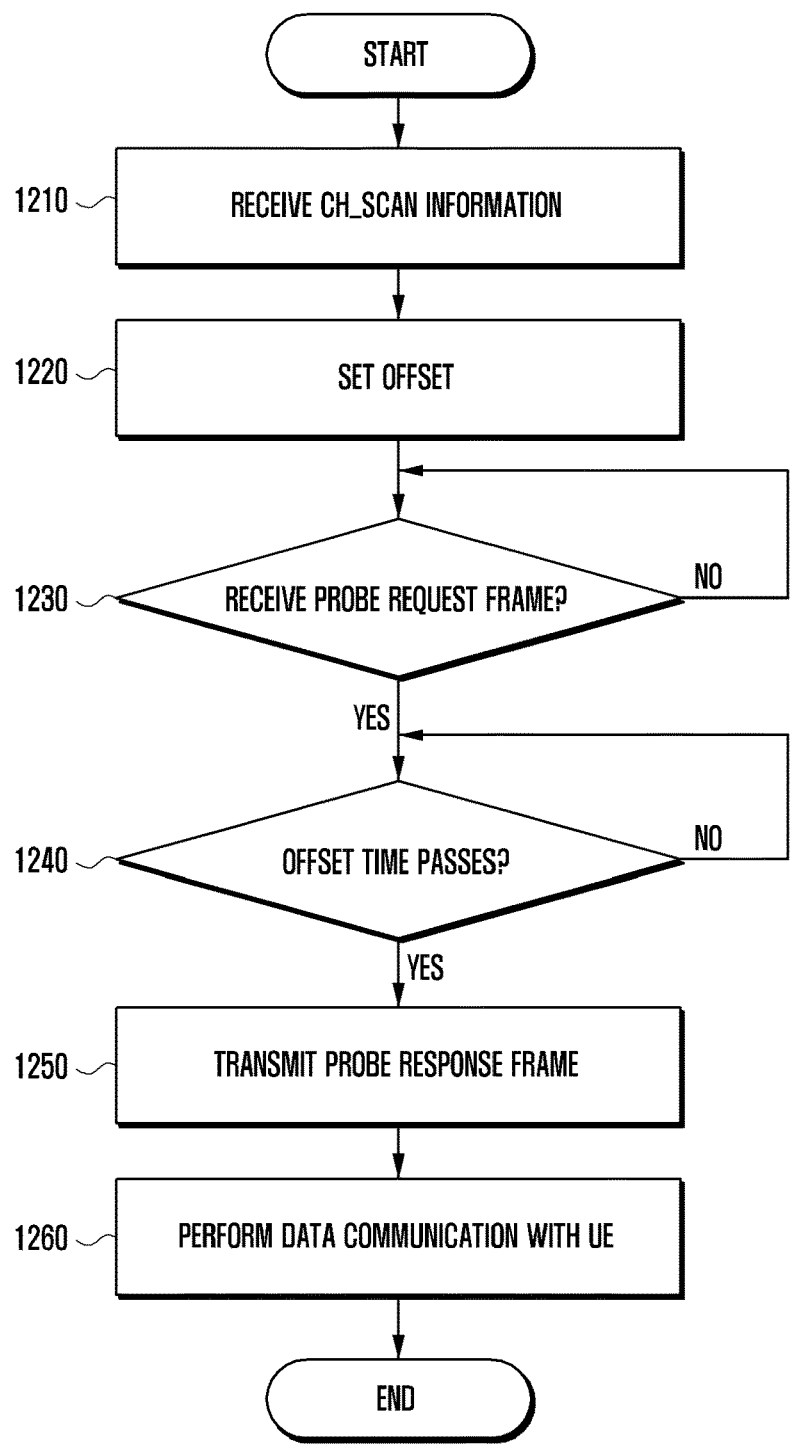
FIG. 12 illustrates an example of a flowchart illustrating operations of the WLAN AP according to an embodiment of the present invention.

FIG. 12 illustrates an example of a flowchart illustrating operations of the WLAN AP according to an embodiment of the present invention.

Referring to FIG. 12, in step 1210, the WLAN AP may receive information on an AP scanning channel from the AP management entity. Further, although not illustrated, the WLAN AP may directly transmit its own SSID and information on a data transmission/reception channel to the AP management entity before step 1210.

According to some embodiments, a specific channel may be preset as the AP scanning channel between the UE and the WLAN AP without the step in which the UE receives the information on the AP scanning channel from the AP management entity. In this case, when the WLAN AP requires the WLAN AP scanning, the WLAN AP may search for and find information on the preset AP scanning channel in a storage unit.

In step 1220, the WLAN AP may set an offset time in consideration of its own load state. Since a detailed description thereof has been made above, it will be omitted here.

The WLAN AP determines whether a probe request frame is received through the AP scanning channel in step 1230 and, when the probe request frame is received, determines whether the offset time passes in step 1240.

When the offset time passes, the WLAN AP may transmit a probe response frame to the UE through the AP scanning channel in step 1250. At this time, the probe response frame with information on the data transmission/reception channel for data communication of the WLAN AP may be transmitted.

Thereafter, in step 1260, the WLAN AP performs data communication with the UE.

Figure 13:
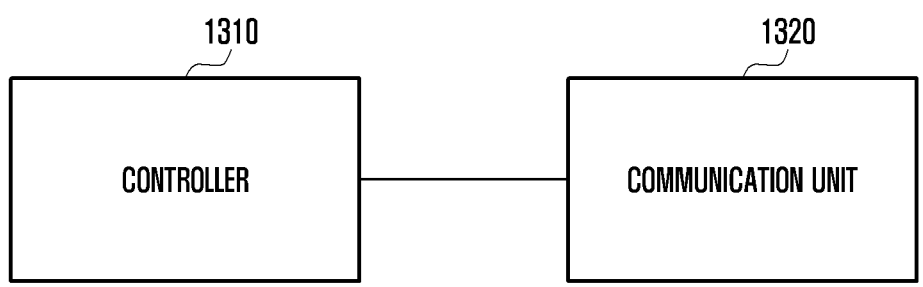
FIG. 13 is a block diagram illustrating a configuration of the UE according to an embodiment of the present invention.

FIG. 13 is a block diagram illustrating a configuration of the UE according to an embodiment of the present invention.

Referring to FIG. 13, a controller 1310 controls the UE to perform any one operation of the above-described embodiments. For example, the controller 1310 may make a control to switch a channel to an AP scanning channel, which is a channel for discovering a WLAN AP, between the UE and the WLAN AP, to transmit a WLAN AP discovery signal in the AP scanning channel, to receive a WLAN AP response signal transmitted from the WLAN AP after an offset time set according to a load state of the WLAN AP passes, and to switch the channel to a data transmission/reception channel for data communication with the WLAN AP.

A communication unit 1320 transmits and receives a signal according to any one operation of the aforementioned embodiments. For example, the communication unit 1320 may transmit a probe request frame to the WLAN AP and receive a probe response frame from the WLAN AP or receive information on the AP scanning channel from the AP management entity.

Figure 14:
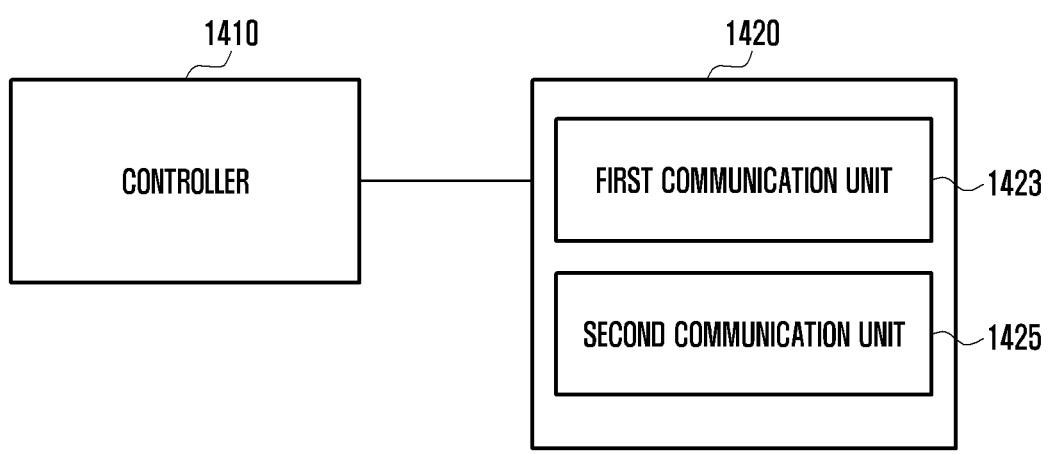
FIG. 14 is a block diagram illustrating a configuration of the WLAN AP according to an embodiment of the present invention.

FIG. 14 is a block diagram illustrating a configuration of the WLAN AP according to an embodiment of the present invention.

Referring to FIG. 14, a controller 1410 controls the WLAN AP to perform any one operation of the above-described embodiments. For example, the controller 1410 may make a control to set an AP scanning channel, which is a channel for discovering a WLAN AP, between the UE and the WLAN AP, to set an offset time according to a load state of the WLAN AP, to receive a WLAN AP response signal from the UE through the AP scanning channel, and to transmit the WLAN AP response signal through the AP scanning channel after the offset time passes.

A communication unit 1420 transmits and receives a signal according to any one operation of the aforementioned embodiments. For example, the communication unit 1420 may receive a probe request frame from the UE, transmit a probe response frame to the UE, or receive information on the AP scanning channel from the AP management entity. At this time, the communication unit 1420 may include a first communication unit 1423, to which the data transmission/reception channel for the data communication with the UE is allocated, and a second communication unit 1425, to which the AP scanning channel for the channel scanning is allocated. That is, the second communication unit 1425 may receive the probe request frame from the UE or transmit the probe response frame to the UE.

Figure 15:
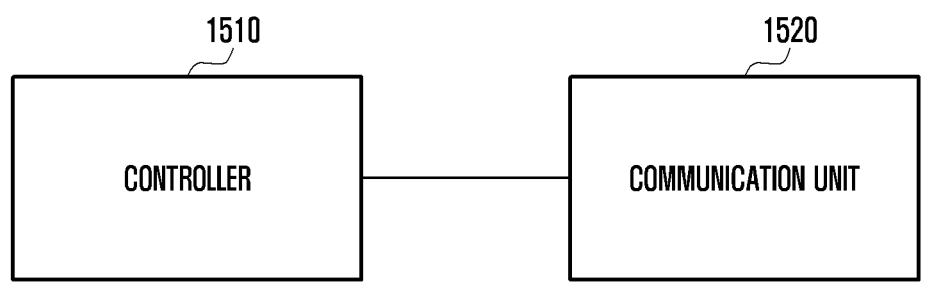
FIG. 15 is a block diagram illustrating a configuration of the AP management entity according to an embodiment of the present invention.

FIG. 15 is a block diagram illustrating a configuration of the AP management entity according to an embodiment of the present invention.

Referring to FIG. 15, a controller 1510 controls the AP management entity to perform any one operation of the above-described embodiments. For example, the controller 1510 may make a control to collect information on WLAN APs within an area of the AP management entity from the UE or the WLAN APs, to extract an AP scanning channel, which is a channel for discovering the WLAN APs by using the collected information on the WLAN APs, and to transmit the information on the AP scanning channel to the UE and the WLAN APs.

A communication unit 1520 transmits and receives a signal according to any one operation of the aforementioned embodiments. For example, the communication unit 1520 may transmit the information on the AP scanning channel to the UE or the WLAN APs.

According to the present invention, since a specific channel is set for discovering WLAN APs and the UE discovers the WLAN APs through the scanning only in such a channel, a discovery time proportional to the number of channels may be significantly reduced to a discovery time for only one channel. Further, an AP having a light load first transmits a probe response frame, so that the UE can always access an under-utilized AP to perform data communication.

Accordingly, the UE can reduce power consumption and use a good WLAN service and the service provider can distribute loads to WLAN APs.

Embodiments of the present invention disclosed in the specification and the drawings are only particular examples to easily describe the technical matters of the present invention and assist in the understanding of the present invention, and do not limit the scope of the present invention. It is apparent to those skilled in the art that other modified examples based on the technical idea of the present invention can be implemented as well as the embodiments disclosed herein.

Therefore, the detailed descriptions should not be construed to be limited in all aspects, but should be considered to be an example. The scope of the present invention should be determined by rational interpretation of the appended claims, and all modifications within a range equivalent to the present invention should be construed as being included in the scope of the present invention

The invention claimed is:

1. A method by a terminal comprising:
receiving, from a base station, first configuration information for scanning one or more first access points (APs);
identifying whether a first request message is transmitted to the first APs, during a predetermined period, based on the first configuration information;
in case that the first request message is not transmitted to the first APs during the predetermined period, transmitting, to the base station, information indicating channel busy associated with the first APs;
receiving, from the base station, second configuration information for scanning one or more second APs;
transmitting, to the second APs, a second request message based on the second configuration information; and
receiving, from the second APs, a response message to which each delay time set for each of the second APs is applied,
wherein:
each delay time set for each of the second APs includes a first time and a second time,
the first time is determined based on load status of a corresponding second AP,
the second time is set based on a random value in order to prevent collision of the second APs, and
the response message is transmitted from the each of the second APs after each delay time has passed.

2. The method of claim 1, further comprising transmitting, to the base station, channel status information for the second APs identified based on the second configuration information.

3. The method of claim 1, further comprising performing one or both of data transmission and data reception with a second AP that transmits the response message first.

4. The method of claim 3, wherein the response message includes information on a channel for one or both of the data transmission and the data reception.

5. A terminal comprising:
a transceiver configured to transmit and receive signals; and
at least one processor configured to:
control the transceiver to receive, from a base station, first configuration information for scanning one or more first access points (APs),
identifying whether a first request message is transmitted to the first APs, during a predetermined period, based on the first configuration information,
in case that the first request message is not transmitted to the first APs during the predetermined period, control the transceiver to transmit, to the base station, information indicating channel busy associated with the first APs,
control the transceiver to receive, from the base station, second configuration information for scanning one or more second APs, control the transceiver to transmit, to the second APs, a second request message based on the second configuration information, and control the transceiver to receive, from the second APs, a response message to which each delay time set for each of the second APs is applied, wherein:
    each delay time set for each of the second APs includes a first time and a second time,
    the first time is determined based on load status of a corresponding second AP,
    the second time is set based on a random value in order to prevent collision of the second APs, and
    the response message is transmitted from the each of the second APs after each delay time has passed.

6. The terminal of claim 5, wherein the at least one processor is further configured to control the transceiver to transmit, to the base station, channel status information for the second APs identified based on the second configuration information.

7. The terminal of claim 5, wherein the at least one processor is further configured to control the transceiver to perform one or both of data transmission and/or data reception with a second AP that transmits the response message first.

8. The terminal of claim 7, wherein the response message includes information on a channel for one or both of the data transmission and the data reception.

\* \* \* \* \*